United States Patent

[11] 3,550,535

| [72] | Inventor | Jack Rooklyn<br>Northridge, Calif. |
|---|---|---|
| [21] | Appl. No. | 754,412 |
| [22] | Filed | Aug. 21, 1968 |
| [45] | Patented | Dec. 29, 1970 |
| [73] | Assignee | Republic Corporation<br>Beverly Hills, Calif.<br>a corporation of California |

[54] TRANSPORTATION SYSTEM
13 Claims, 8 Drawing Figs.

[52] U.S. Cl....................................................... 104/118,
105/141; 198/202
[51] Int. Cl......................................................... B61b 5/00,
B61b 13/06
[50] Field of Search........................................... 104/118,
18, 25; 105/141; 198/202, 204; 312/343, 344

[56] References Cited
UNITED STATES PATENTS

| 2,160,057 | 5/1939 | Carus et al. | 198/202 |
| 2,725,757 | 12/1955 | Murphy | 198/202 |

OTHER REFERENCES
NEW RAPISTAN BELT TRAINER; The Rapids-Standard Company Inc. Copyright 1952: Copy in Class 198 Subclass 202

*Primary Examiner*—William T. Dixson, Jr.
*Attorney*—Lindenberg and Freilich

ABSTRACT: A transportation system for carrying small goods in a factory or the like comprising a single rail in the form of a flat strip, and a vehicle having collars at the front and back that carry rail-engaging wheels. Each collar includes a pair of wheels that engage the opposite edges of the rail, and wheels that engage the upper and lower surfaces of the rail.

PATENTED DEC 29 1970
3,550,535
SHEET 1 OF 2
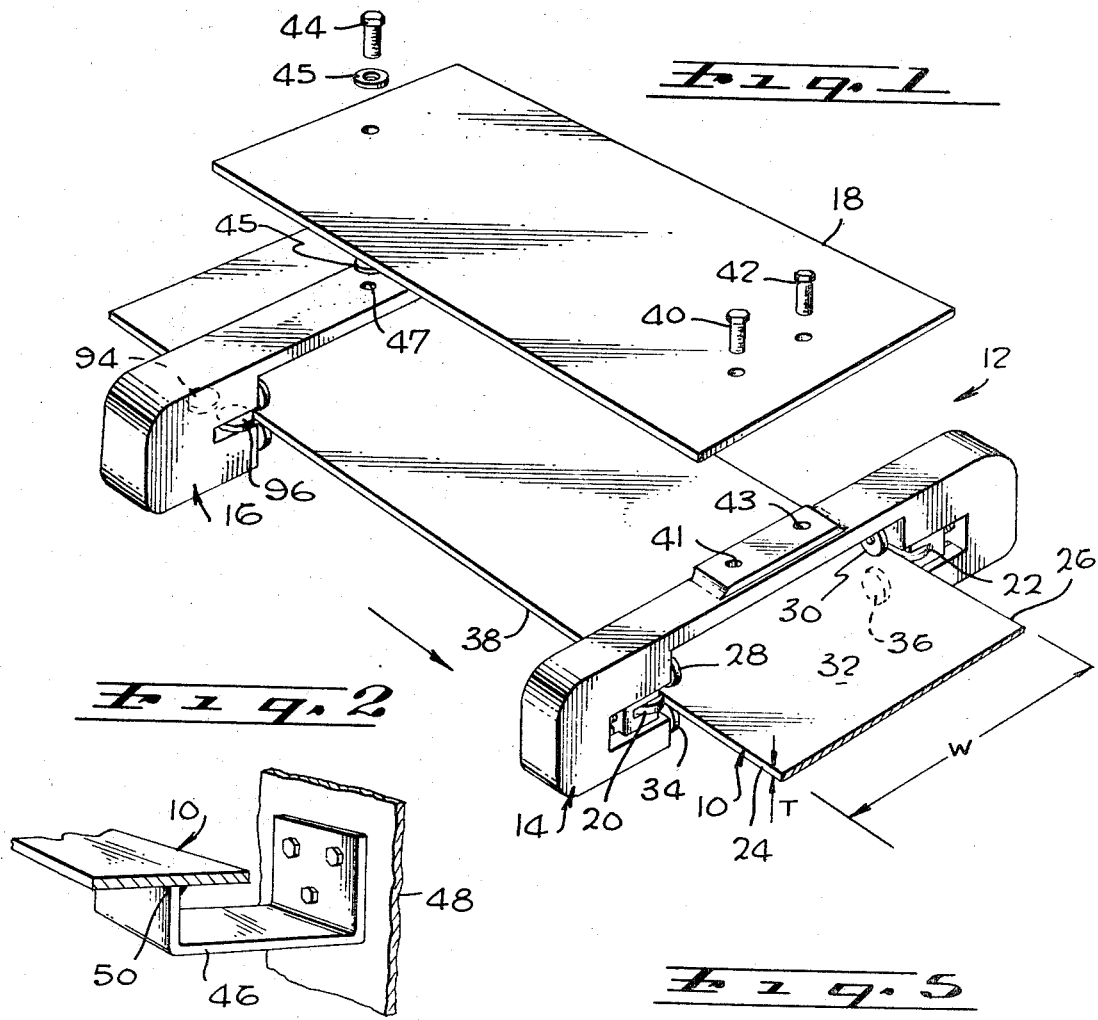
Fig. 1
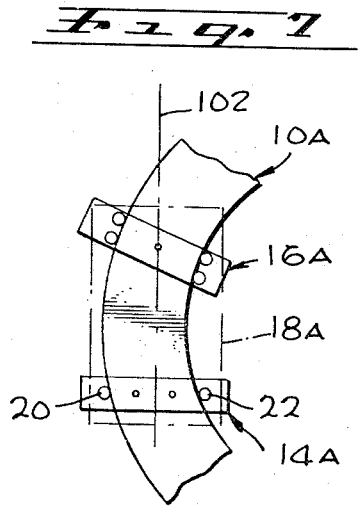
Fig. 2
Fig. 7
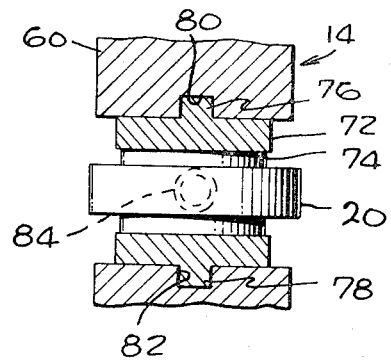
Fig. 5
JACK ROOKLYN
INVENTOR.
BY
Lindenberg & Freilich
ATTORNEYS

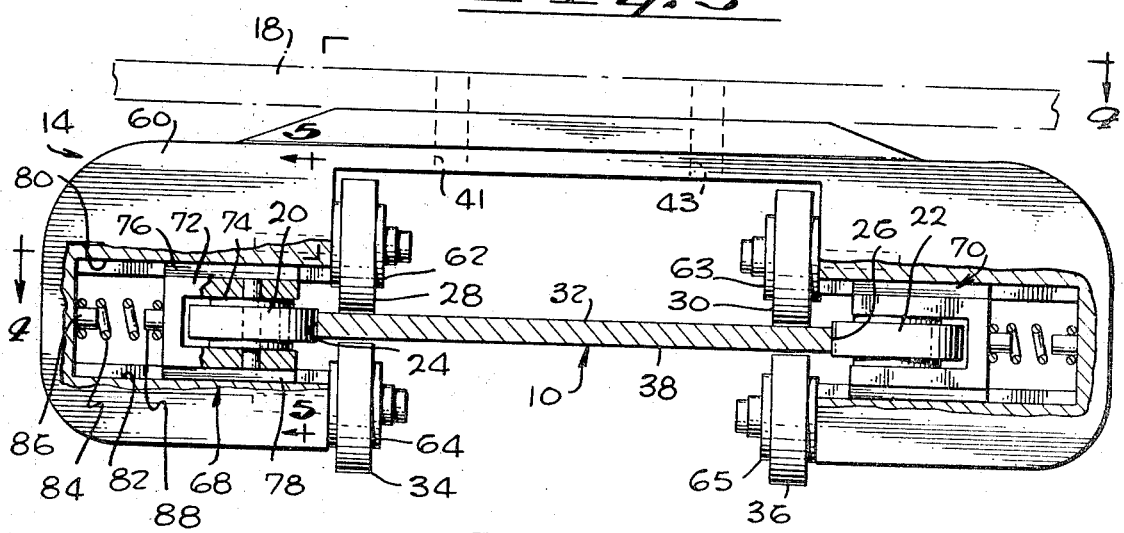
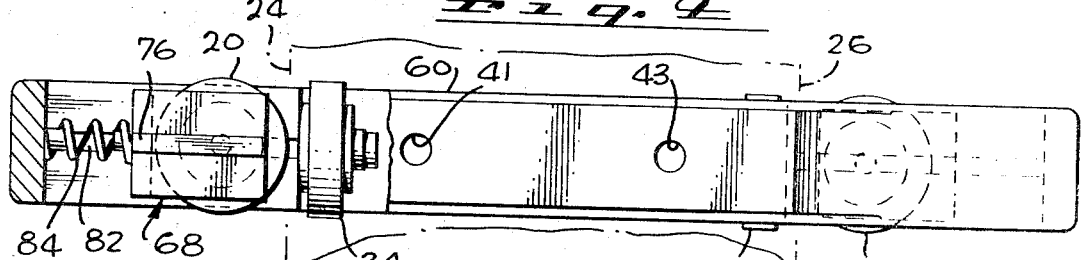
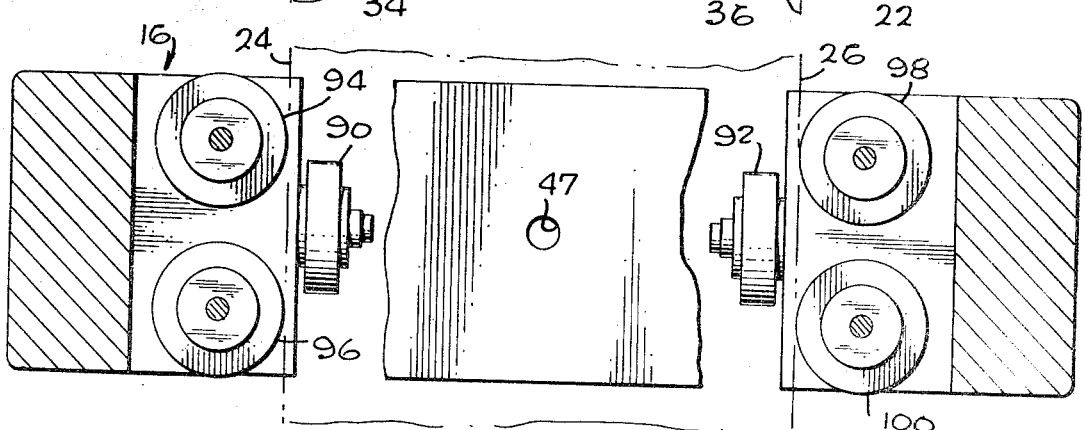
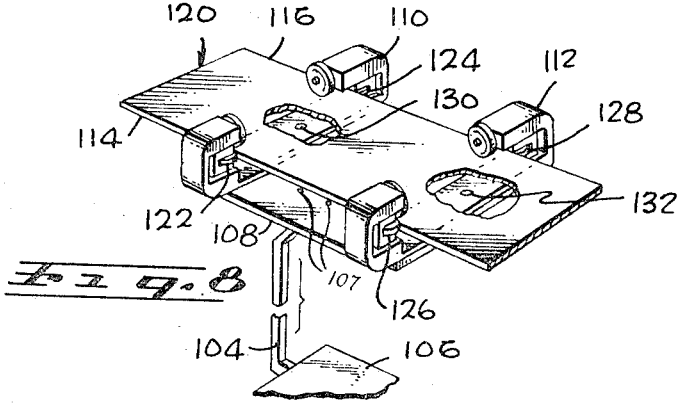

3,550,535

TRANSPORTATION SYSTEM

BACKGROUND OF THE INVENTION

1. Field of the Invention

This invention relates to transportation systems.

2. Description of the Prior Art

The movement of small parts in manufacturing plants can be accomplished by small track-guided vehicles. One type of transportation system utilizes a pair of rails supported a couple of feet above the ground, and small wheeled vehicles which roll on the tracks. The vehicles have bodies in the form of boxes or pallets on which parts can be laid which are to be transported. Flanges are provided on the wheels to guide them along the track.

One problem encountered in the foregoing system is that vehicles easily come off the tracks. The flanges help to prevent this, but the light vehicle weight readily allows derailment. Another problem is that the minimum track curvature is substantial, because the flanges bind on the track for very sharp turns. A simple and economical transportation system which eliminated these problems would be of substantial use in a variety of applications.

OBJECTS AND SUMMARY OF THE INVENTION

One object of the invention is to provide a small transportation system which is extremely simple and economical.

Another object is to provide a transportation system which employs vehicles which cannot be derailed.

Still another object is to provide a transportation system which enables smooth vehicle movement around sharp curves.

In accordance with the present invention, a transportation system is provided which employs a very simple rail structure, yet which is versatile and reliable. The system employs a flat strip of metal, such as a long plate, as the rail. The vehicle has collars at the front and back, which have rail engaging wheels. Each collar has a pair of wheels that engage opposite edges of the rail to prevent lateral shifting, and wheels that engage the upper and lower rail surfaces to firmly support the vehicle.

In one embodiment of the invention, the vehicle has a body for holding parts, a forward collar which is fixed to the body, and a rear collar which is pivotally joined to the body. This provides a three point support for the body, to stabilize it. On one of the collars, the side wheels which engage the rail edge are movable laterally and are spring biased toward the rail, to permit wheel movement away from the rail edge during travel around a sharp curve in the rail.

The novel features of the invention are set forth with particularity in the appended claims. The invention will be best understood from the following description when read in conjunction with the accompanying drawings.

BRIEF DESCRIPTION OF THE DRAWINGS

FIG. 1 is a perspective exploded view of a transportation system constructed in accordance with the invention;

FIG. 2 is a perspective view of a rail and a support bracket therefore;

FIG. 3 is a sectional front view of the forward collar assembly of the vehicle of FIG. 1;

FIG. 4 is a partially sectional plan view of the forward collar of FIG. 3;

FIG. 5 is a sectional view taken on the line 5–5 of FIG. 3;

FIG. 6 is a partially sectional plan view of the rear collar assembly of the vehicle of FIG. 1;

FIG. 7 is a diagrammatic plan view of the vehicle of FIG. 1, showing the manner of negotiation of a curve in the rail; and FIG. 8 is a perspective view of a transportation system constructed in accordance with another embodiment of the invention.

DESCRIPTION OF THE PREFERRED EMBODIMENTS

FIG. 1 is a simplified illustration of a transportation system, which includes a rail 10 in the form of a strip. The rail has a cross section in the form of a long rectangle, with a width W at least several times greater than its thickness T, and may be formed of steel of other structural material. A vehicle 12 which moves along the rail includes forward and rearward collars 14 and 16 which support a body in the form of a pallet 18. The pallet is designed to hold goods of small to medium size, such as can be carried by a man, and is especially useful in manufacturing plants and the like. A pair of bolts 40 and 42 extend through holes 41 and 43 in the front collar frame to hold the pallet to the collar. A bolt 44 extends through a hole 47 in the rear collar frame to hold the pallet to the rear collar. A pair of bearings 45 permit rotation of the pallet relative to the rear collar about a vertical axis.

The forward collar 14 has a set of three wheels on each side, which are engaged with the rail 10. Two side wheels 20 and 22 are engaged with the opposite edges 24 and 26 of the rail, to resist lateral shifting. A pair of top wheels 28 and 30 are engaged with the upper surface 32 of the rail, while a pair of bottom wheels 34 and 36 are positioned for engagement with the lower rail surface 38 if the vehicle is raised slightly. The rearward collar 16 is constructed in a similar manner, except that it includes two pairs of side wheels, as will be described later in greater detail. The use of wheels that engage the opposite edges and surfaces of the rail substantially prevents derailment, in spite of blows, tilting, and the like which may be encountered.

FIG. 2 illustrates a bracket 46 for attaching the rail 10 to a wall 48. The bracket may be constructed of the same strip material as the rail, but bent to the configuration shown. It is welded at 50 to the rail to extend downwardly therefrom, and is attached by bolts to the wall. The extreme simplicity of the rail, and the ease with which it can be supported are apparent when compared to rail systems which employ two spaced rails. The vehicle 12 also can be used with a rail system employing a pair of rails if they include flanges, or edge portions, for engaging the six or eight wheels of each collar. A dual rail system can often reduce the weight of the rail, but the simplicity of the single rail often offsets this, particularly in light duty transport systems.

FIGS. 3, 4 and 5 are more detailed views of the front collar 14. The collar includes a collar frame 60, on which the six wheels 20, 22, 28, 30, 34 and 36 are supported. The top and bottom wheels are mounted on ball bearings 62 through 65 which are directly attached to the collar frame. The side wheels 20 and 22 are mounted on support assemblies 68 and 70 which permit movement toward and away from the edges 24 and 26 of the rail.

The support assembly 68 comprises a bracket 72 that holds a ball bearing 74 on which the side wheel 20 is mounted. The bracket has a pair of guides 76 and 78 at its top and bottom which engage keyways 80 and 82 formed in the collar frame, to guide the bracket in motion toward and away from the rail edge. A spring 84 is disposed about a pair of guide rods 86 and 88 on the collar frame and bracket, respectively. The spring urges the bracket laterally toward the rail, and therefore urges the side wheel 20 toward the rail edge 24. The opposite support assembly 70 is constructed in a similar manner to urge the side wheel 22 toward the rail edge 26 and to enable its limited lateral movement.

FIG. 6 is a more detailed view of the rear collar 16, showing the pair of lower wheels 90 and 92 and the four side wheels 94, 96, 98 and 100. The two side wheels on each side of the vehicle are positioned with one in back of the other along the length of the rail. This helps to keep the rear collar extending perpendicular to the length of the track, thereby preventing excessive side shaking even over rough rail sections. However, the rear collar could be constructed with only two side wheels for greater economy.

The vehicle construction enables the negotiation of very sharp curves. FIG. 7 shows the orientation of the vehicle components during travel around a curved track portion 10A. The side wheels of the rear collar 16A hold that collar perpendicular to the local track direction, i.e., parallel to the radius of curvature of the track. However, the front collar 14A is rotated so that it is perpendicular to a line 102 which passes through the center of the rear collar. The line 102 passes through the point where the pallet 18A is rotatably mounted on the rear collar. The mounting of the forward collar 14A enables it to turn relative to the local track because of the mounting of the side wheels 20 and 22 for lateral movement. In the configuration of FIG. 7, both side wheels 20 and 22 have been moved laterally outward so that the distance between their axes of rotation is greater than it is when the rail is straight.

The amount of outward movement of the side wheels 20 and 22 is small for even sharp curves, so the rail can be formed to follow close around corners of a building or around building columns. The three-point support of the pallet 18 on the rail enables secure fastening of the pallet without elaborate joints. The vehicle travels smoothly and stably, without the danger of derailment, over tracks which are simple to construct and support. A wide variety of means can be used to propel the vehicle, such as a cable running alongside the track to pull the vehicle.

FIG. 8 illustrates another embodiment of the invention wherein a hanger 104 is provided which carries goods on a carrier 106. The hanger is rigidly fixed by several bolts 107 to the platform or pallet member 108 which is attached to the collars 110 and 112. This provides an overhead conveyor system wherein the hanger is supported against swaying in any direction.

In the system of FIG. 8, each of the collars 110 and 112 has only one side wheel engaged at either edge 114 and 116 of the rail 120. Each of these four side wheels 122, 124, 126 and 128 is movable laterally and is spring biased toward the rail edge, in the same manner as the wheels of the forward collar 12 of the foregoing embodiment. In addition, the pallet member 108 is rotatably connected to each collar at 130 and 132 to permit rotation about a substantially vertical axis (when the vehicle is not tilted). It has been found that this further facilitates the smooth negotiation of sharp curves. This manner of construction can, of course, also be used for a nonoverhead conveyor system of the type described previously.

Although particular embodiments of the invention have been described and illustrated herein, it is recognized that modifications and variations may readily occur to those skilled in the art, and consequently, it is intended that the claims be interpreted to cover such modifications and equivalents.

I claim:

1. A transportation system comprising:
rigid rail means having opposite side edges and upper and lower rail surfaces;
means for holding said rail means stationary above the ground; and
a vehicle for moving along said rail means, including side wheels engaged with said opposite side edges, and upper and lower wheels engaged with said upper and lower rail surfaces, respectively.

2. The transportation system described in claim 1 wherein said rigid rail means has the form of a strip of substantially rectangular cross section with a width at least several times greater than its thickness.

3. The transportation system described in claim 1 wherein:
at least one of said side wheels is mounted for movement toward and away from said rigid rail means; and including
spring means for biasing toward said rail means, said side wheel which is mounted for movement toward and away from said rail means.

4. A transportation system comprising:
rail means having opposite side edges and upper and lower rail surfaces; and
a vehicle including forward and rearward collars, each collar having wheels engaged with said opposite rail edges and said upper and lower rail surfaces, vehicle body means, a pair of laterally spaced fasteners joining said body means to a first of said collars to resist relative rotation about a vertical axis, and means joining said body means to a second of said collars for relative rotation substantially about a vertical axis.

5. A transportation system comprising:
rail means having opposite side edges and upper and lower rail surfaces; and
a vehicle including forward and rearward collars, each collar having wheels engaged with said upper and lower rail surfaces and side wheels mounted for movement toward and away from said rail means, means for biasing said side wheels of said forward and rearward collars toward said rail means, vehicle body means, and means joining said body means to each of said collars for relative rotation substantially about a vertical axis.

6. The transportation system described in claim 1 including:
a hanger; and
means for fixing said hanger to said vehicle to prevent relative swaying between them, said hanger having carrier means at a level below the level of said rail.

7. A transportation system comprising:
rail means having opposite side edges and upper and lower rail surfaces;
a vehicle body;
forward and rearward collar frames;
means for attaching said vehicle body to said collar frames;
a pair of wheel brackets;
means for mounting said brackets on either side of a first of said collar frames, for substantially lateral movement toward and away from the side edges of said rail means;
a pair of side wheels, each rotatably mounted on one of said brackets for engagement with said opposite side edges of said rail means;
spring means for urging said brackets toward said rail; and
upper wheels rotatably mounted on said collars for rollably supporting said collars on said upper rail surface.

8. The transportation system described in claim 7 wherein:
said rail means comprises a member having a substantially rectangular cross section with a width several times greater than its thickness; and including
rail support means extending downwardly from the lower surface of said member.

9. The transportation system described in claim 7 wherein a second of said collar frames includes two pairs of side wheels, each engaged with an opposite edge of said rail means, with the two side wheels of each pair spaced one behind the other along the length of the rail.

10. The transportation system described in claim 9 wherein:
said first collar frame is positioned forward of said second collar frame; and
said means for attaching comprises means for rotatably coupling said second collar frame to said vehicle body to permit rotation about a substantially vertical axis, and means for fixing said first collar frame to said vehicle body with respect to rotation about a vertical axis.

11. The transportation system described in claim 7 including:
a second pair of wheel brackets;
second means for mounting said second pair of brackets on either side of a second of said collar frames, for substantially lateral movement toward and away from the side edges of said rail means;
a second pair of side wheels, each rotatably mounted on one of said second brackets for engagement with said opposite side edges of said rail means;
second spring means for urging said brackets toward said rail; and wherein
said means for attaching comprises means for rotatably coupling each of said collar frames to said vehicle body.

12. In a transportation system including a rail having upper, lower, and side rail surfaces, the improvement comprising:
a vehicle including forward and rearward collar means, each collar means having two groups of wheels, one on either side of said rail, each group including an upper wheel for engagement with said upper rail surface, a lower wheel for engagement with said lower rail surface, and a side wheel for engagement with said side rail surface;
at least one of said side wheels mounted for lateral movement; and
means for spring biasing said side wheel which is mounted for lateral movement, to urge it toward engagement with said rail.

13. The transportation system described in claim 12 wherein:
said vehicle includes a vehicle body; and
at least one of said collars is rotatably coupled to said body to permit rotation about a substantially vertical axis.